Patented June 21, 1932

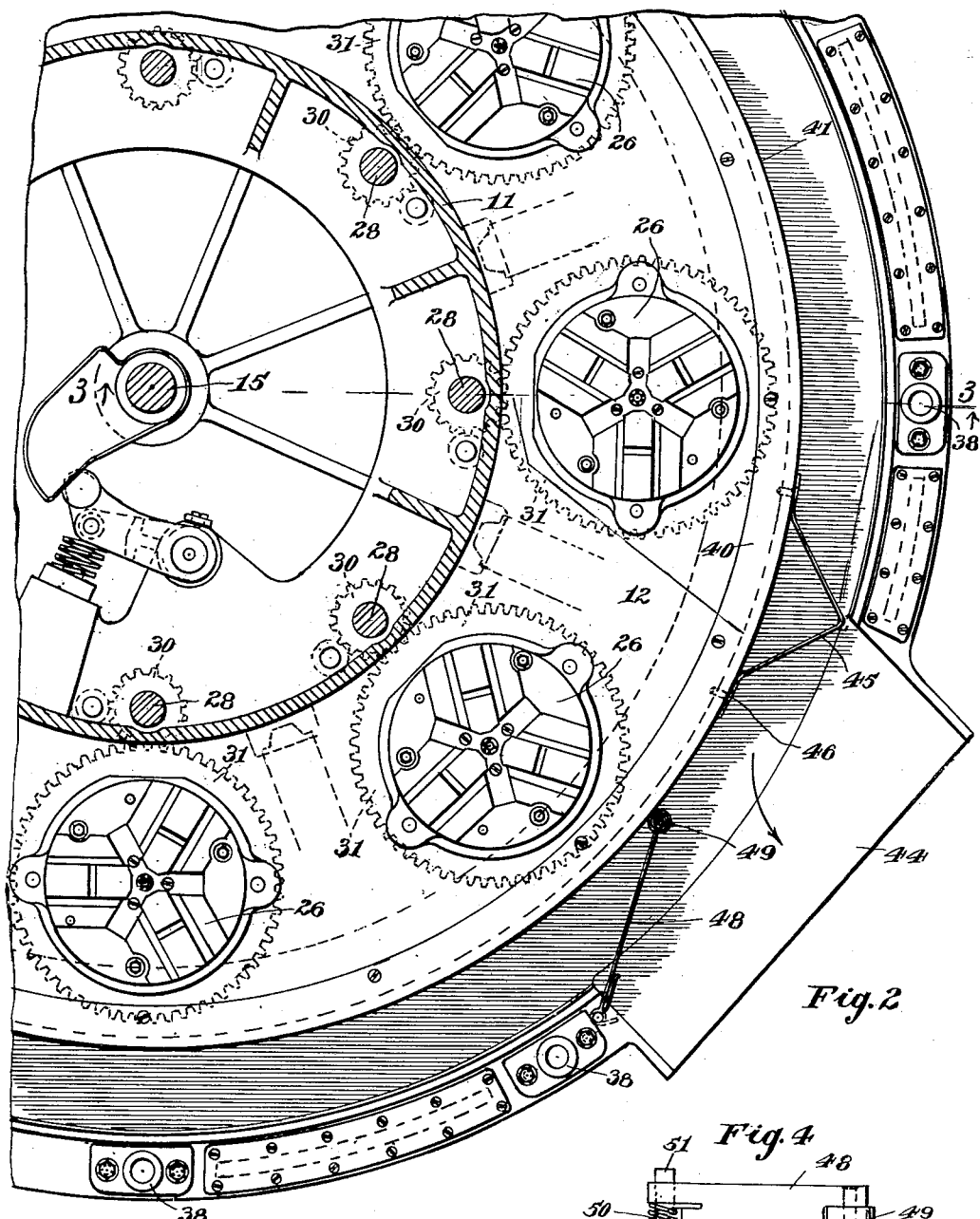
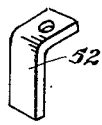
Fig. 2
Fig. 5 Fig. 4
INVENTOR.
Ernest H. Johnson
BY
Chamberlain + Newman
ATTORNEYS.

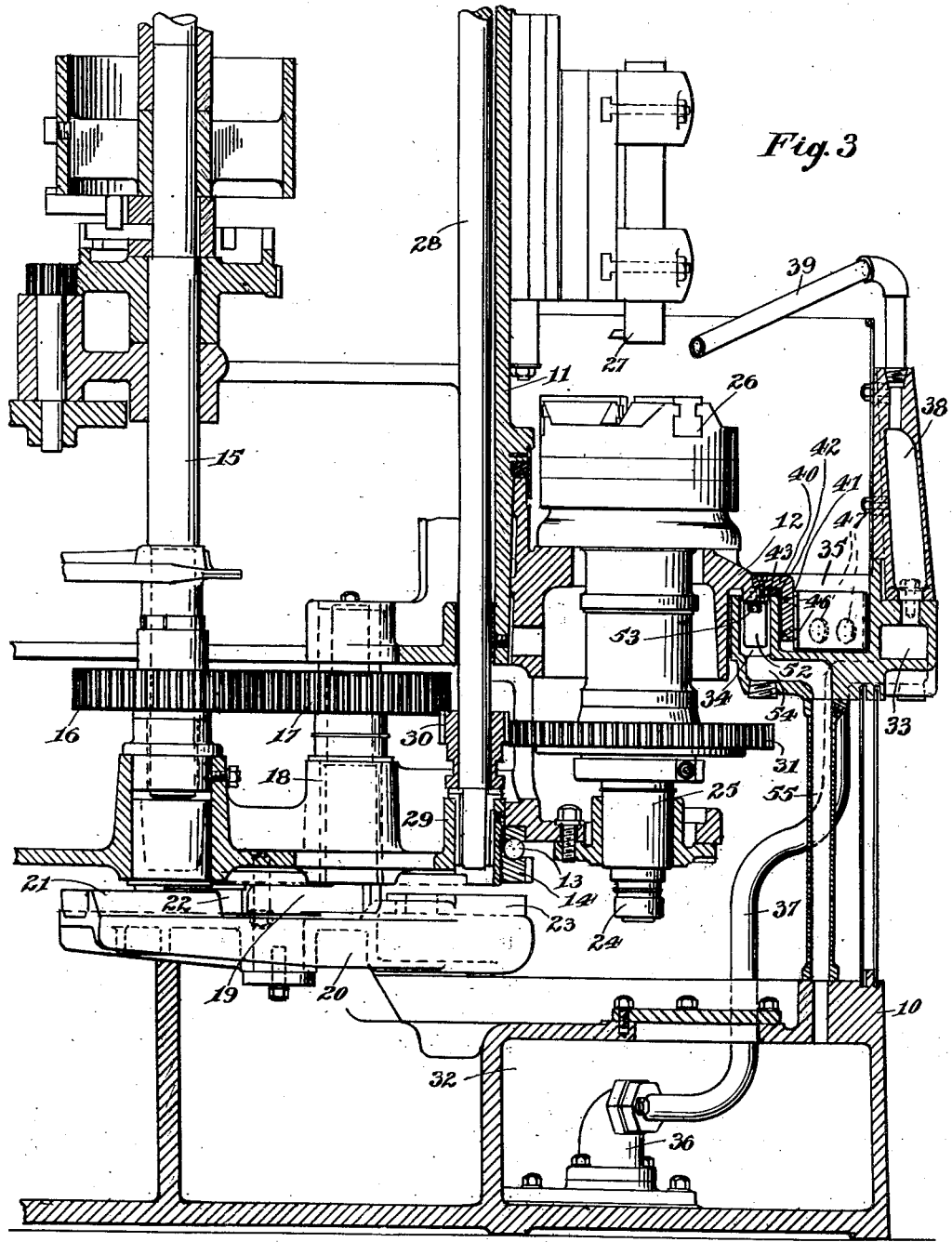

1,864,307

UNITED STATES PATENT OFFICE

ERNEST H. JOHNSON, OF BRIDGEPORT, CONNECTICUT, ASSIGNOR TO THE BULLARD COMPANY, OF BRIDGEPORT, CONNECTICUT, A CORPORATION OF CONNECTICUT

CHIP REMOVER AND WATER AND DUST SEAL FOR MACHINE TOOLS

Application filed September 25, 1930. Serial No. 484,328.

This invention relates to metal working multiple spindle lathes such as the "Mult-Au-Matic" and "Contin-U-Matic" machines, and refers more particularly to combined means for removing the chips and providing a water and dust seal for the running parts of the machines. The invention as applied, in addition to a chip wiper for expelling the chips from the machine as produced, also includes means for preventing dust and the cutting lubricant, which is supplied to the cutting tools during their operation, from getting into the bearings and other working parts of the machine.

The invention is particularly applicable to vertical lathes including a rotary carrier or table adapted to turn upon a vertical axis, and especially to machines wherein the rotary carrier serves to carry a series of vertical chucking spindles for rotating the work pieces with respect to the cutting tools.

In the accompanying drawings I have shown the invention applied to a vertical multiple spindle machine of the Bullard "Mult-Au-Matic" type which includes a carrier as above suggested and which is adapted for step-by-step rotary movements, and known as a station type of machine. The invention is, however, equally applicable to a vertical type of continuous turning machine, that is a machine wherein both the carrier and tool heads rotate continuously upon a fixed base and column and do not make stops of the carrier for loading and unloading the work pieces.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a perspective elevational view of an improved type of "Mult-Au-Matic", a multiple spindle machine, provided with my novel chip removing means;

Fig. 2 is a horizontal sectional plan view on an enlarged scale of a portion of the machine shown in Fig. 1, and further illustrating the invention;

Fig. 3 is a central vertical sectional view taken on line 3—3 of Fig. 2;

Fig. 4 is a detached side elevational view of the spring actuated scraper as shown attached to the base in Fig. 2 and extended in the trough for scraping the chips therefrom; and Fig. 5 is a detached perspective view of the wiper shown secured to the carrier in Fig. 3 and depending therefrom into the annular lubricant trough.

Figure 1:
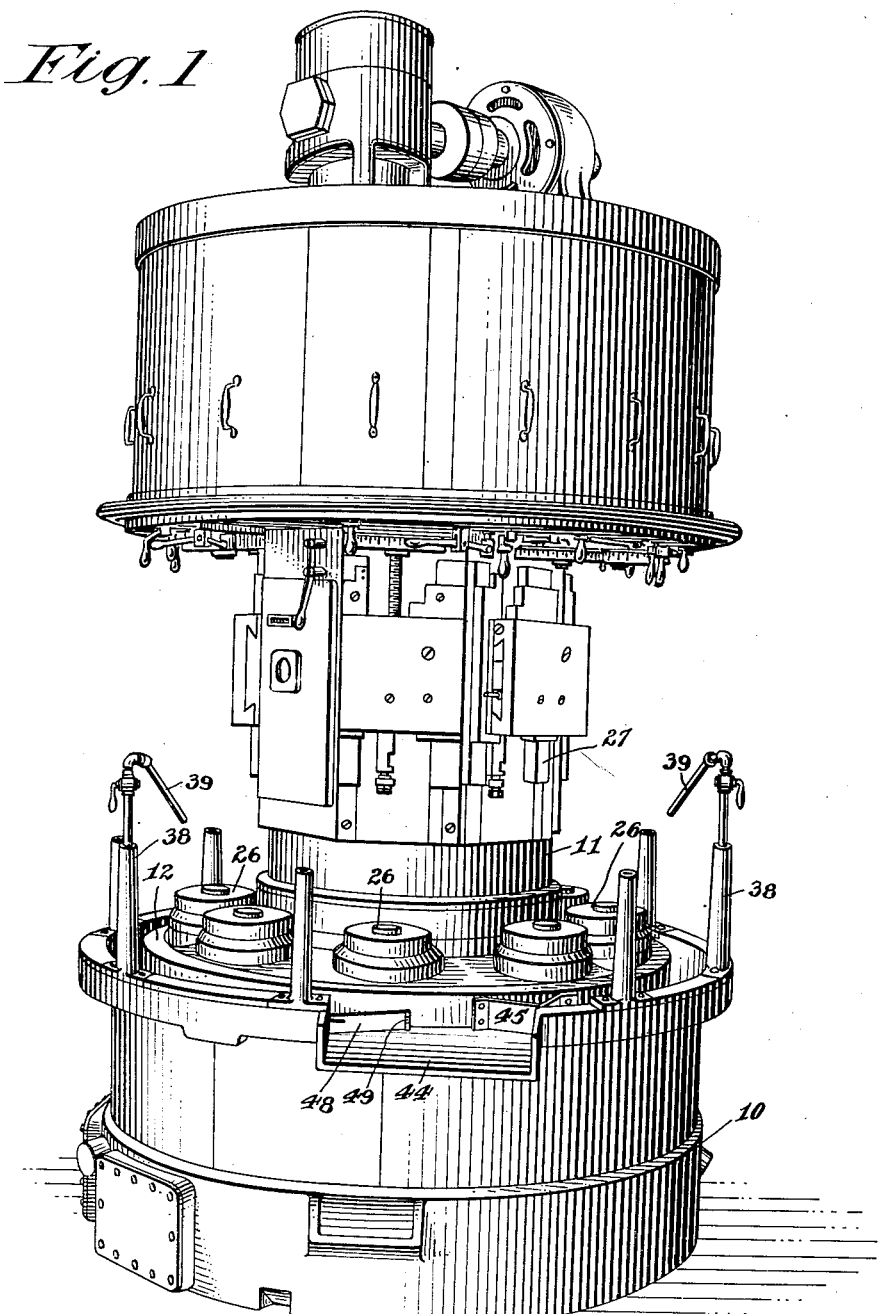

Referring in detail to the characters of reference marked upon the drawings, 10 represents the base of the multiple spindle lathe to which the invention is shown applied. 11 is a hollow column mounted centrally upon this base and together with the base supports a rotatable carrier 12 mounted to turn upon ball bearings 13 carried in an annular groove of an adjustable ring 14.

The particular type of carrier herein illustrated is designed for step-by-step rotary movements about the axis of its central shaft 15 through which said carrier is rotated, and which carries a gear 16 that meshes with and drives a second gear 17 mounted on a short shaft journaled in bearings 18 of the base, and upon the lower end of which is mounted a crank 19 for actuating an index arm 20 carried thereby and through which the indexing operations are accomplished. The rear end of this arm is provided with a guide 21 which is in slidable engagement at all times with a shoe 22 swivelled to the base in axial alignment with the driving shaft 15. The forward end of the indexing arm is also provided with an open groove 23 in its top side for engagement and disengagement with a roller 24 carried on the end of the vertical chuck spindle 25 journaled in the carrier and whereby the carrier, through engagement with its several spindles, is given successive rotary movements so as to carry the work chucks 26 from one working station to another, for positioning the work carried by the chucks in alignment with the respective tools 27 for turning operations upon the work.

The several work spindles 25 are separately and independently operated through drive shafts 28 within the stationary column, the lower end being journaled as at 29 in the base. Each of these drive shafts is provided with a slidable pinion 30 mounted to be automatically operated longitudinally of said shaft for engagement and disengagement with the spindle gear 31, said engaging lift of the pinion being effected at the completion of the indexing operation whereby the spindle is driven.

Owing to the fact that these machines, for the most part, operate upon steel pieces and that said operations are performed at a relatively high rate of speed, a constant supply of cutting lubricant is required upon the cutting tool and surface of the work engaged. This cutting lubricant is supplied and drained off in various ways in different types of machines.

In the matter of the machine illustrated I have shown a reservoir 32 in the base of the machine upon which the cutting lubricant is pumped to the cutting tools and back to which said lubricant is permitted to drain. The annular upper portion of the base of the machine shown is provided with an annular lubricant chamber 33, an inner annular pocket 34 and an intermediate annular chip trough 35, the latter being slightly larger than the two former. The cutting lubricant is supplied to the cutting tools from the reservoir by a pump 36 connected by a suitable pipe 37 with the before mentioned annular lubricant chamber 33 and suitable stand pipes 38 connected with said chamber and adjustable nozzles 39 mounted upon the stand pipes so as to supply cutting lubricant to the tools at the several working stations. From these tools the lubricant flows down into the chip trough and from there it runs out of the spout into a settling tank, not shown, and back into the reservoir.

This large annular chip trough 35 serves also and more particularly to receive the chips or turnings removed from the metal being operated upon. As this annular trough is formed in the stationary base of the machine, the chips would naturally fill and clog it if some provision for their automatic removal were not made. Therefore I have secured a ring 40 to the top of the annular edge portion of the carrier so that its annular apron 41 will extend into the said trough closely adjacent to its inner annular wall so as to cover and enclose said inner wall and provide an annular pocket 42 thereunder which is packed with a suitable packing 43 to prevent the cutting lubricant from working up out of the chip trough and into the pocket. This apron obviously provides a movable annular wall within the trough which in a measure serves to agitate and move the chips in the direction of rotation of the carrier, but in order to insure a positive movement of all chips within the trough to the outlet spout 44 where they are discharged from the machine, I provide a chip wiper 45 which is preferably formed of sheet metal to form inclined outer surfaces, and having its end portions secured to the side of the said apron as at 46, the said wiper being of a size corresponding to that of the width of the trough so that it will shove the collection of chips before it and discharge them out through the spout with the rotation of the carrier. In this respect it will also be noted that the rear wall of the wiper is provided with holes 47 through which the cutting lubricant, which may accumulate in the walls of the wiper, can flow out. In order to insure the complete discharge of these chips from the wiper and trough through the discharge spout, I provide a scraper 48 which is pivotally supported within the outer annular rim portion of the upper part of the base, adjacent to one side of the outlet spout and is disposed into the trough from the outlet opening. The inner free end of this scraper is provided with a small roll 49 that rides upon the apron and up and over the inclined surfaces of the wiper 45 each time it comes around in engagement therewith, for the purpose of insuring the removal of the chips therefrom. A torsional spring 50 is mounted on the pivotal pin 51 secured within the upper annular base and has one end shouldered against said base and its other end disposed against the side of the scraper so as to normally hold it against the apron.

In order to further protect the working parts of the machine from metallic dust or dirt which might possibly get through the packing 43, I have formed the annular pocket 42 herebefore mentioned and in it provided a dust wiper 52, see Figs. 3 and 5, which is attached to the underside of the carrier as by means of a screw 53. This wiper is preferably formed from sheet metal having its long arm extended down into the pocket so that any accumulation of dust upon the side walls thereof will be dislodged and conveyed to the outlets 54 of which there may be several and thence allowed to pass down through the pipe 55 to the base, thereby dislodging it before it fills up and works over the inner wall into the bearings of the machine.

Having thus described my invention, what I claim and desire to secure by Letters Patent is:

1. In a lathe of the class described, the combination with a fixed base, an annular chip trough formed therein and having an outlet spout, a rotary carrier mounted in the base, work spindles mounted in the carrier, tools for operations upon work carried by the work spindles, a wiper secured to the movable carrier and extended into the chip trough and adapted to move around with the carrier in a manner to move chips through the fixed trough and discharge the same through the spout.

2. In a lathe of the class described, the combination with a fixed base, an annular chip trough formed therein and having an outlet spout, a rotary carrier mounted in the base, work spindles mounted in the carrier, tools for operations upon work carried by the work spindles, an annular apron secured on the carriage and extended down into the chip trough, a wiper mounted on the apron and extended into the chip trough and adapted to move around with the carrier in a manner to move the chips through the fixed base and discharge the chips through the spout.

3. In a lathe of the class described, the combination with a fixed base, an annular chip trough formed in the base and having an outlet spout, a rotary carrier mounted in the base, work spindles mounted in the carrier, tools for operations upon work carried by the work spindles, an annular apron secured on the carriage and extended down into the chip trough, a wiper mounted on the apron and extended into the chip trough and adapted to move around with the carrier in a manner to discharge the chips through the spout, and a movable scraper secured to the base and extended into the chip trough in the path of travel of the wiper and adapted to be operated thereby to remove the chips therefrom and discharge the same from the trough.

4. In a lathe of the class described, the combination with a base, an annular chip trough formed in the base and having an outlet spout, said base also having an annular pocket on the inner side of the chip trough with a drain therefrom, a rotary carrier mounted in the base and covering the pocket, work spindles mounted in the carrier, tool heads for operations upon work carried by the work spindles, an annular apron secured on the carriage and extended down into the chip trough, a packing between the apron and wall of the chip trough, and a wiper mounted on the apron and extended into the chip trough and adapted to move around with the carrier in a manner to discharge the chips from the spout.

5. In a lathe of the class described, the combination with a base having an annular chip trough formed therein, and an annular pocket formed on the inner side of the chip trough and having one or more drains therefrom, a rotary carrier, work spindles mounted therein, tool heads for operations upon work carried upon said spindles, means for supplying cutting lubricant to said tools and work, an annular depending apron secured to the carrier and extended down into the chip trough, a chip wiper mounted upon the annular face of the apron, and extended across the trough and adapted to move around annularly within the trough, a scraper yieldably mounted in the base adjacent the spout adapted to normally bear against the periphery of the apron and said wiper to scrape the chips therefrom and direct them into the spout.

6. In a lathe of the class described, the combination with a base having an annular chip trough formed therein with an outlet spout, a rotary carrier, work spindles mounted therein, tool heads for operations upon work carried on said spindles, an annular depending apron secured on the carriage and extended down into the trough, an inclined chip wiper mounted on the outer face of the apron and extended across the trough and adapted to move around annularly with the apron, a spring actuated scraper hingedly mounted in the base adjacent the spout and having its free end extended into the trough for slidable engagement with the chip wiper to scrape the chips therefrom and direct them into the spout.

7. In a lathe of the class described, the combination with a base and annular chip trough formed in the base and also having an annular pocket on one side of the chip trough with a drain therefrom, a rotary carrier mounted in the base and covering the pocket and having an annular apron extended down into the chip trough, tool heads for operating upon the work carried by the work spindles, a packing between the apron and wall of the chip trough and a wiper mounted on the apron and extended into the chip trough and adapted to move around with the carrier in a manner to discharge the chips.

8. In a lathe of the class described, the combination with a base having an annular chip trough formed therein, an annular pocket formed on the inner side of the chip trough and having one or more drains therefrom, a rotary carrier, work spindles mounted therein, tool heads for operations upon work carried on said spindles, a wiper secured to the carrier and extended into the pocket, means for supplying cutting lubricant to said tools and work, an annular depending apron secured upon the carriage and extended down into the chip trough, a chip wiper mounted on the annular face of the apron, and extended across the trough and adapted to move around annularly within the trough, a scraper yieldably mounted in the base adjacent the spout and adapted to normally bear against the periphery of the apron and said wiper to scrape the chips therefrom and direct them into the spout.

9. In a lathe of the class described, the combination with a base having an annular chip trough formed therein with an outlet spout, a rotary carrier, work spindles mounted therein, tool heads for operations upon work carried on said spindles, an annular depending apron secured on the carriage and extended down into the trough, a projected inclined chip wiper mounted on the outer face of the apron and extended across the trough and adapted to move around annularly with the apron, a scraper hingedly mounted in the base adjacent the spout and having its end extended into the trough and a roller mounted in the end of the scraper for engagement with the apron and chip wiper to scrape the chips therefrom and direct them into the spout.

10. In a lathe of the class described, a base having an annular chip trough and outlet, a cutting lubricant chamber, on one side of the chip trough, and an annular pocket on the other side of the chip trough, a rotary carrier mounted in the base and covering the pocket, a wiper secured to the carrier and extended into the pocket, work spindles mounted in the carrier, tool heads for operations upon work carried by the work spindles, outlet pipes connected with the lubricant chamber to supply cutting lubricant to the cutting tools, an annular apron on the carriage and extended down into the chip trough, a packing between the apron and wall of the chip trough, and a wiper mounted on the apron and extended into the chip trough and adapted to move around with the carrier in a manner to discharge the chips from the spout.

11. In a machine of the class described, the combination with a base, an annular chip trough formed therein and having an outlet spout, a carrier mounted to rotate in the base, work holders, cutting tools for operations upon work supported by the holders, a scraper hingedly secured to a fiixed wall of the trough and having a free end portion extending into the trough, means for normally holding the free end of the scraper against a movable portion of the carrier in a manner to direct chips through the spout from the trough by the movement of the carrier.

Signed at Bridgeport, in the county of Fairfield and State of Connecticut, this 23rd day of September, A. D. 1930.

ERNEST H. JOHNSON.